United States Patent [19]

Lundsager

[11] Patent Number: 4,670,341

[45] Date of Patent: Jun. 2, 1987

[54] HOLLOW FIBER

[75] Inventor: Christian B. Lundsager, Ashton, Md.

[73] Assignee: W. R. Grace & Co., New York, N.Y.

[21] Appl. No.: 735,020

[22] Filed: May 17, 1985

[51] Int. Cl.$^4$ .................. B32B 27/34; D02G 3/00
[52] U.S. Cl. ........................ 428/372; 210/500.23; 428/394; 428/398
[58] Field of Search ............ 428/376, 398, 372, 394, 428/375; 210/500.2, 500.23, 500.22; 264/41

[56] References Cited

U.S. PATENT DOCUMENTS

| | | |
|---|---|---|
| 3,351,495 | 11/1967 | Larsen et al. |
| 3,423,491 | 1/1969 | McLain et al. ............... 264/49 |
| 3,745,202 | 7/1973 | Riggleman et al. |
| 3,871,950 | 3/1975 | Hashino et al. |
| 3,975,478 | 8/1976 | Leonard. |
| 4,020,230 | 4/1977 | Mahoney et al. .......... 264/289.6 X |
| 4,055,696 | 10/1977 | Kamada et al. ............... 428/398 |
| 4,290,987 | 9/1981 | Soehngen et al. ............ 428/376 X |
| 4,401,567 | 8/1983 | Shindo et al. ................ 428/398 X |
| 4,405,688 | 9/1983 | Lowery et al. ............... 428/398 X |
| 4,501,793 | 2/1985 | Sarada ......................... 428/376 X |

FOREIGN PATENT DOCUMENTS

83/00495  1/1984  PCT Int'l Appl. .

*Primary Examiner*—Lorraine T. Kendell
*Attorney, Agent, or Firm*—Howard J. Troffkin

[57] ABSTRACT

A hollow fiber suitable for ultrafiltration formed from a microporous polyolefinic composition comprising from 8 to 93 volume percent polyolefin, from 7 to 92 volume percent of filler and from 0 to 10 volume percent of a plasticizer for the polyolefin to provide hollow fiber walls having pores at least 70 percent of which have a diameter of 0.3 micron or less.

15 Claims, No Drawings

HOLLOW FIBER

BACKGROUND OF THE INVENTION

The present invention is directed to microporous hollow fibers having improved characteristics of strength and rigidity and to the process of forming the same. More particularly, the present invention relates to microporous, highly filled polyolefinic hollow fibers having structural strength and rigidity capable of inhibiting the collapse of the fiber and exhibiting porosity of extremely small pores and of narrow pore size distribution.

Hollow porous fibers are well known for their usefulness as filter medium. The advantages of permeable hollow fibers or permeable films are also known as they possess a larger surface area per unit volume than a flat film of similar porous configuration.

Filtration devices have been used to separate bacteria, proteins, viruses, colloidal substances, and the like. Ultrafiltration devices normally used for such separations have used membranes made from various materials such as gel cellophane films, cellulose acetate membranes, etc. However, these conventional membrane filters have various drawbacks such as low water permeability and low surface area per unit volume due to their normal flat configurations. Further, certain of these filter membranes are not stable to the environment to which they are required for use.

Hollow fibers which are porous have been produced from various polymeric materials such as polyacrylonitrile, as described in U.S. Pat. No. 3,877,955 and polyolefins, such as described in U.S. Pat. Nos. 4,020,230; and 4,401,567 and 4,405,688. Each of these materials are formed by a method which requires formation of the hollow fiber and subsequent inducing porosity in the fibrous materials by stretching, and annealing of the material after formation. It has been found that the pores and hollow fiber structure products tend to collapse under filter conditions normally encountered.

It is highly desired to have a polyolefin based hollow microporous fibrous material for use as a filtration medium in that polyolefins are a substantially inert compound with respect to a wide variety of materials requiring separation by such technique. It is thus highly desired to have a polyolefinic hollow fiber product which is capable of maintaining its porosity and stability during filtration.

SUMMARY OF THE INVENTION

The present invention is directed to a hollow fiber product having a high degree of microporosity and porosity of a narrow pore size distribution to provide a controlled filtering medium. It is further the object of the present invention to have a microporous hollow fiber product capable of retaining its porosity and exhibiting a high degree of structural stability and rigidity to avoid collapsing of the hollow fiber under the filtration conditions.

The present microporous hollow fiber product is composed of a composition comprising from about 8 to 93 percent by volume of a polyolefin, from about 7 to 92 percent by volume of an inert filler and from 0 to about 15 percent by volume of a plasticizer for the polyolefin.

DETAILED DESCRIPTION OF THE INVENTION

The present invention is directed to a microporous, hollow fiber product capable of being used as a filtration medium and to a method of forming same. One particular aspect of the present invention relates to production of a microporous hollow fiber of excellent chemical and physical properties composed of a high molecular weight polyolefin and an inert filler.

The microporosity of the present fiber product has a pore size which is generally less than about 0.5 micron in diameter and, preferably, having greater than fifty percent of the pores being less than 0.3 micron in diameter. In most cases at least ninety percent of the pores have a diameter smaller than 0.3 micron.

The present invention requires the utilization of a polyolefin, preferably polyethylene or polypropylene of high density. The polyolefin must have an average molecular weight ($MW_w$) of at least about 100,000 and can be selected from polyolefins having a molecular weight of from 100,000 to about 2,000,000. The polyolefin can be selected from homopolymers, such as polyethylene or polypropylene or from copolymers formed from a mixture of hydrocarbon olefinic monomers, such as ethylene, propylene, butene and the like or from a mixture of at least 90 weight percent of hydrocarbon olefinic monomer with the remainder selected from other olefinic monomer such as acrylonitrile, acrylic acid or acrylic acid esters. The particular comonomer used must be selected so that the non hydrocarbon group it introduces into the copolymer is inert with respect to the particular application.

The polyolefin can also be comprised of a mixture of a high molecular weight polyolefin and a low molecular weight polyolefin. Representative of polyolefins of high and low molecular weight which are operable in the instant invention are polyethylene, polypropylene, polybutene, ethylene-propylene copolymers, ethylene-butene copolymers, propylene-butene copolymers, ethylene-acrylic acid copolymers and the like. The mixture can be formed from about 5 to 95 weight percent high molecular weight polymer with the corresponding about 95 to 5 weight percent of low molecular weight polymer. It is preferred that the low molecular weight polymer be the major component of the polyolefin mixture.

The term "high molecular weight polyolefin," as used herein, is intended to refer to a polyolefin having an average molecular weight of at least 500,000. The term "low molecular weight polyolefin," as used herein, refers to polyolefins having an average molecular weight of from 100,000 to 500,000. When only one polyolefin is used in forming the subject separator, the average molecular weight should preferably be greater than 150,000 and, most preferably, greater than 200,000.

The polyolefin must be substantially insoluble in the solvents used and at the temperatures used to extract the plasticizer from the polyolefin-filler-plasticizer composition as more fully described herein below. Such insolubility or inertness to the action of solvents is imparted to the polyolefin by its crystallinity content or by the judicious choice of solvent used in the extraction procedure. The partially crystalline polyolefin, such as polyethylene and isotactic polypropylene are ideally suited to such an application because they are substantially insoluble in common hydrocarbons and other organic and aqueous solvents at low temperatures.

Conventional stabilizers or antioxidants may be employed in the compositions of the present invention to prevent thermal and oxidative degradation of the polyolefin component. Representative of the stabilizers are 4,4 thiobis (6-tert-butyl-m-cresol) ("Santonox") and 2,6-di-tert-butyl-4-methylphenol ("Ionol").

The plasticizer can be soluble or insoluble in water. Representative of the water-insoluble plasticizers are organic esters, such as the sebacates, phthalates, stearates, adipates, and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; low molecular weight polymers such as polyisobutylene, polybutadiene, polystyrene, atactic polypropylene, ethylene-propylene rubber; ethylene-vinyl acetate copolymer, oxidized polyethylene, coumarone-indene resins and terpene resins; tall oil and linseed oil.

Illustrative of the water-soluble plasticizers are ethylene glycol, polyethylene glycol, polypropylene glycol, glycerol, and ethers and esters thereof; alkyl phosphates such as triethyl phosphate; polyvinyl alcohol, polyacrylic acid and polyvinyl pyrrolidone.

When a plasticizer is used which is not totally removed from the composition during the extraction step but forms part of the hollow fiber product, it imparts flexibility, to the fiber. In such cases the plasticizer must be chosen from compounds which are insoluble and inert with respect to the materials contacting the filter medium during filtration.

The filler can be soluble or insoluble in water. Representative of the fillers which are substantially water insoluble and operable in the instant invention are carbon black, coal dust and graphite; metal oxides and hydroxides such as those of silicon, aluminum, calcium, magnesium, barium, titanium, iron, zinc, and tin; metal carbonates such as those of calcium and magnesium; minerals such as mica, montmorillonite, kaolinite, attapulgite, talc, diatomaceous earth and vermiculite; synthetic and natural zeolities; cement; precipitated metal silicates such as calcium silicate and aluminum polysilicate; alumina silica gels; wood flour, wood fibers and bark products; glass particles including microbeads, hollow microspheres, flakes and fibers; and salts such as molybdenum disulfide, zinc sulfide and barium sulfate.

Illustrative of the water-soluble fillers operable in the present invention are inorganic salts such as the chlorides of sodium, potassium, and calcium; acetates such as those of sodium, potassium, calcium, copper and barium; sulfates such as those of sodium, potassium and calcium; phosphates such as those of sodium and potassium; nitrates such as those of sodium and potassium; carbonates such as those of sodium and potassium and sugar.

In the embodiment of this invention in which the resultant hollow fiber contains unextracted filler, the filler should be preselected with respect to end use so that the filler is inert with respect to the materials it comes in contact during filtration operation.

The preferred filler is dry, finely divided silica. It has been found that separators produced from compositions containing this filler have unusually small pore size, e.g., as low as 0.002 micron and void volume and are readily wetable.

It should be understood that any of the commercially available wetting agents known to the art, such as sodium alkyl benzene sulfonate, sodium lauryl sulfate, dioctyl sodium sulfosuccinate, and isooctyl phenyl polyethoxy ethanol, may be used to enhance the wettability of the hollow fiber by the filtration medium. These wetting agents can also be used to enhance the wettability of the filler prior to its inclusion in the composition.

The plasticizer used in forming the initial composition improves the processability of the composition, i.e., lower the melt viscosity, or reduces the amount of power input which is required to compound and to fabricate the composition. In addition, since the plasticizer is the component which is easiest to remove from the polymer-filler-plasticizer composition, it is useful in imparting porosity to the hollow fiber.

The filler provides the primary means by which the plasticizer is absorbed and held in the instant composition. It should, therefore, not be soluble in the plasticizer. The capacity of the filler particles to absorb and hold the plasticizer in the composition is proportional to its surface area. High surface area fillers are either materials of very small particle size or materials of a high degree of porosity. Generally, the size of the filler particles can range from an average of about 0.01 micron to about 10 microns in diameter depending upon the porous character of the filler. The surface area of the filler can range from about 30 to 950 square meters per gram. Preferably, the surface area of the filler should be at least 100 square meters per gram. Ordinarily, amounts of filler used in the instant composition can range from about 5 to 60 volume percent. The specific amount of filler used will depend primarily on its surface area and the amount of plasticizer used.

The polyolefin, plasticizer and filler are chosen for forming a particular hollow fiber product based on inertness and non-solubility with respect to the ultimate application of the fiber. For example, if the resultant hollow fiber is to be used as a filter medium of an aqueous solution, the components must be chosen from water-insoluble materials as described above. The components are initially mixed to form a substantially homogeneous mixture, formed into a hollow fiber configuration and then the fiber is subjected to a solvent for the plasticizer/non-solvent for the filler to extract substantially all of the plasticizer from the hollow fiber product. Thus, the hollow fiber product is formed by initially blending into a homogeneous composition the components of from 5 to 65 (preferably 8 to 40) volume percent of polyolefin, 5 to 60 (preferably 10 to 40) volume percent filler and the remainder being plasticizer provided that the plasticizer forms at least 30 (preferably at least 50) volume percent of the total composition. Suitable compositions include polyolefin/filler/plasticizer in volume percents of: 20/20/60; 15/15/70; 20/15/65; and 10/15/75.

The components of the instant composition can be mixed by any conventional manner which will produce a substantially uniform mixture. To produce a particularly uniform mixture, the components can be premixed at room temperature in a blender. The polyolefin-filler-plasticizer dry blends are then fluxed in a conventional mixer such as a Banbury mixer or melt homogenized in a conventional two roll mill.

The composition is then melt extruded through a conventional nozzle used for producing hollow fibers in conjunction with a heated ram or screw extruder. The nozzle preferably has a double tubular construction to inhibit deviation of the wall thickness although other conventional constructions may be used. Considerations such as the dependency of viscosity on temperature necessary for extrusion and upon the die swell as issued from the nozzle or spinnerette are well known to those skilled in the art and will not be elaborated on here. The optimum spinning temperature for any particular composition can be readily determined empirically and this is done by carrying out a relatively small number of laboratory scale extrusions.

The hollow fiber is initially formed by melt spinning the polyolefin/filler/plasticizer composition at a head temperature of from about 10° to about 90° C. above the crystalline melting point of the polymer used in the composition. Air or other inert gas can be supplied into the hollow fiber forming composition to cause and maintain its hollow shape while cooling. The air may be injected by a needle extending into the center portion of each orifice of the spinnerette. The fiber, upon exiting from the nozzle or spinnerette is cooled by contacting with a cooling medium, such as cool air and the hollow fiber is drawn down to the desired size.

The hollow fiber of the instant invention may be further modified by having a membrane fiber coated on at least one wall, that is the outer, inner or both walls of the fiber. Such fibers have great utility in gas separation and in liquid reverse osmosis technology and are superior to those presently known due to the enhanced strength of the final fiber product. The coating can be accomplished in a number of manners such as by forming the microporous fiber of the subject invention using a die and related extruder capable of coextruding a film which circumscribes and forms a unitary fiber product. Alternately, extrusion can be conducted in known manners using a precast billet feed concentrically composed of the microporous forming composition and of the membrane composition. Another manner of forming a coated hollow fiber of the present invention is to first form a hollow fiber capable of forming into a microporous structure, as described above, and then subjecting the fiber to a bath composed of a solution of the membrane forming polymer. Polymers capable of forming membrane films are well known and include cellulose acetate, regenerated cellulose, polyvinyl alcohol, polyvinyl chloride and the like. The particular polymer chosen for use will depend on the ultimate use of the fiber and the environment it is to be placed in. The membrane should normally be of a thickness which is equal to or less than (preferably less than 50 percent) the thickness of the fiber wall formed by the microporous composition.

The hollow fiber can be formed to have an average wall thickness of from 1 to about 20 mils and an average inner diameter of the hollow tube which may range from about 5 to 500 mils. Such dimensions can be achieved by using standard spinnerettes with the particular dimensions being dependent upon the end use for which it is employed.

The formed hollow fibers are then subjected to an extraction procedure. The specific extraction procedure and medium employed depends upon the plasticizer to be extracted. A single stage extraction may be required or if two or more dissimilar plasticizers are used in the same composition, a multiple stage extraction may be required. Numerous extracting solvents are suitable for usage in this invention with the particular solvent depending upon the particular ingredient to be extracted. The solvent or extraction conditions should be chosen so that the filler and polyolefin are essentially insoluble. For example, when petroleum oil is to be extracted from the composition of the hollow fibers the following solvents are suitable: chlorinated hydrocarbons, such as trichloroethylene, tetrachloroethylene, carbon tetrachloride, methylene chloride, tetrachloroethane, etc.; hydrocarbon solvents such as hexane, benzene, petroleum ether, toluene, cyclohexane, gasoline, etc. If polyethylene glycol is to be extracted, the extraction medium can be water, ethanol, methanol, acetone, etc.

The extraction temperature can range anywhere from room temperature up to the melting point of the polyolefin (preferably up to about 10° C. below the melting point) as long as the polyolefin does not dissolve (or if applicable, of the membrane forming polymer, if lower).

The time of the extraction will vary depending upon the temperature used and the nature of the plasticizer being extracted. For example, when a higher temperature is used, the extraction time for an oil of low viscosity can be only less than a minute whereas if the extraction is performed at room temperature, the time requirement for a polymeric plasticizer can be in order of several minutes up to several hours.

The final composition of the formed microporous hollow fiber product will depend upon the original components and the degree of plasticizer extraction achieved. The microporous hollow fiber product has a composition composed of from 8 to 93 volume percent polyolefin, 92 to 7 volume percent filler and from 0 to about 10, preferably 0–3 volume percent plasticizer. The resultant hollow fiber has the distinct feature of being a filled polyolefin which is capable of exhibiting a high degree of structural stability while having a high degree of microporosity. For example, the void volume of the fiber walls is normally at least about 30% and preferably at least about 50% and can be as high as 70 to 80 percent. The pore size distribution as measured by Mercury Intrusion Method (Ind. Eng. Chem. Anal. Ed. 17 787 (1945) shows that greater than 70 percent of the pore diameter was from 0.03 to 0.3 microns with at least about 35 to 40 percent having a pore diameter of less than 0.1 micron and a mean pore diameter of less than 0.2 microns, preferably less than 0.15 microns. The pore size distribution was also measured by Nitrogen Absorption (BET) method and showed the mean pore diameter to be consistent with the values stated above with values somewhat smaller being normal for the same material showing that pores of even smaller diameter are present and accountable by this method.

The pore size of the resultant hollow fibers of the present invention can be varied by varying the amount of plasticizer contained in the initial composition used for forming the hollow fiber by extrusion and the degree of extraction of the plasticizer from the formed hollow fiber. The plasticizer aids in imparting the resultant voids in the walls of the hollow fiber and provides for substantial uniform and very small pore size and, in addition, aids in imparting a sufficient degree of fluidity to the polyolefin to permit extraction of the filled polyolefin.

The resultant filled polyolefin microporous hollow fiber product is capable of exhibiting some flexibility while having resistance to collapse while known non-filled products do not exhibit this resistance capability. Further, the present hollow fiber product has microporosity of smaller and more uniform pore size distribution than achievable through presently used means, such as physical stretching, etc.

What is claimed is:

1. A hollow fiber suitable for ultrafiltration comprising a hollow tube structure having an average wall thickness of from 1 to 20 mils and an average inner diameter of said tube of from about 5 to about 500 mils, the tube wall being formed of a substantially uniform mixture of from 8 to 93 volume percent polyolefin having a weight average molecular weight of at least 100,000; from 7 to 92 volume percent of an inert filler; and from 0 to 10 volume percent of a plasticizer for said polyolefin, and the tube wall having pores at least 70 percent having a diameter of less than 0.3 micron and a mean pore diameter of less than 0.2 micron.

2. The hollow fiber of claim 1 wherein the polyolefin is selected from a high density polyethylene or a high density polypropylene.

3. The hollow fiber of claim 1 wherein the polyolefin is a mixture of from 5 to 95 weight percent of a polyolefin having an average molecular weight of from 100,000 to 500,000 and the corresponding 95 to 5 weight percent of a polyolefin having a weight average molecular weight of from 500,000 to 2,000,000.

4. The hollow fiber of claim 3 wherein the polyolefin of a weight average molecular weight of from 100,000 to 500,000 comprises the major component of the polyolefin mixture.

5. The hollow fiber of claim 1 wherein the plasticizer contained in the wall is less than 3 volume percent and the filler has a particle size diameter of from about 0.01 to about 10 micron.

6. The hollow fiber of claim 1 wherein the walls of said fiber has a void volume of at least 30%.

7. The hollow fiber of claim 2 wherein the walls of said fiber has a void volume of at least 30%.

8. The hollow fiber of claim 3 wherein the walls of said fiber has a void volume of at least 30%.

9. The hollow fiber of claim 4 wherein the walls of said fiber has a void volume of at least 30%.

10. The hollow fiber of claim 5 wherein the walls of said fiber has a void volume of at least 30%.

11. The hollow fiber of claim 1 wherein at least one wall of the fiber is coated with a polymeric membrane.

12. The hollow fiber of claim 2 wherein at least one wall of the fiber is coated with a polymeric membrane.

13. The hollow fiber of claim 3 wherein at least one wall of the fiber is coated with a polymeric membrane.

14. The hollow fiber of claim 4 wherein at least one wall of the fiber is coated with a polymeric membrane.

15. The hollow fiber of claim 5 wherein at least one wall of the fiber is coated with a polymeric membrane.

* * * * *